United States Patent [19]

Nakata et al.

[11] Patent Number: 5,588,751
[45] Date of Patent: Dec. 31, 1996

[54] ROLLING BEARING AND METHOD OF FABRICATING THE SAME

[75] Inventors: Ryuji Nakata, Osaka; Hiroshi Komiya, Kashihara, both of Japan

[73] Assignee: Koyo Seiko Co., Ltd., Japan

[21] Appl. No.: 614,473

[22] Filed: Mar. 13, 1996

[30] Foreign Application Priority Data

Mar. 13, 1995 [JP] Japan ..................... 7-053010
Mar. 5, 1996 [JP] Japan ..................... 8-047743

[51] Int. Cl.[6] .................................. F16C 33/66
[52] U.S. Cl. ................. 384/463; 384/470; 384/909
[58] Field of Search .................... 384/463, 470, 384/909, 484, 527, 528

[56] References Cited

U.S. PATENT DOCUMENTS 3,790,239  2/1974  Laux et al. ................... 384/463
4,073,552  2/1978  Christy ......................... 384/470
4,492,415  1/1985  Baile et al. ................... 384/463
4,534,871  8/1985  Johnson ........................ 384/463

*Primary Examiner*—Lenard A. Footland
*Attorney, Agent, or Firm*—Popham Haik Schnobrich & Kaufman, Ltd.

[57] ABSTRACT

A rolling bearing has a pair of races, rolling elements and a cage. A region defined between the pair of races is filled with a solid lubricating composition. A film including a lubricating component is formed in a clearance between the cage and the rolling elements, whereby the solid lubricating composition is prevented from being interposed therebetween. The film including a lubricating component is formed prior to the process of filling the region with the lubricating composition to solidify the lubricating composition. It is preferable that the film including a lubricating component is formed on the respective surfaces in contact with the solid lubricating composition of the races, the rolling elements and the cage.

16 Claims, 5 Drawing Sheets

ROLLING BEARING AND METHOD OF FABRICATING THE SAME

CROSS REFERENCE TO RELATED APPLICATION

This application claims priority benefits under 35 USC §119 of Japanese Patent Application Serial No. 7-053010 and Japanese Patent Application Serial No. 8-047743, the disclosure of which is incorporated by reference.

BACKGROUND OF THE INVENTION

1. Field of the Invention

The present invention relates to a rolling bearing which comprises a pair of races, rolling elements and a cage and in which a region defined between both the races is filled with a solid lubricating composition which is composed of a mixture of a resin and a lubricating component, and a method of fabricating the same.

2. Description of Related Art

A lubricating component such as lubricating oil or grease is generally used for lubricating a rolling bearing. The lubricating component is scattered at the time of rotation of the rolling bearing because it has flowability. As a result, the lubricating component must be frequently supplied.

Furthermore, the lubricating component such as lubricating oil or grease is helpless against entrance of water, dust, dirt, and the like from outside the rolling bearing. In the case of a rolling bearing used in an environment which makes the entrance of water, dust, dirt, and the like easy, sealing members with a complicated structure must be provided.

In order to solve the above-mentioned problems, a lubricating composition formed by solidifying a mixture of a resin such as polyethylene and the above-mentioned lubricating component is provided (see, for example, unexamined, Japanese Patent Publication No. 54-22415 (1979), Japanese Patent Publication No. 63-23239 (1988), and Japanese Patent Publication No. 3-67559 (1991). The solid lubricating composition is obtained by filling a region inside a rolling bearing with the mixture in a fluid shape, then heating the mixture to not less than the melting point of the resin and then cooling the heated mixture.

The solid lubricating composition exhibits lubricating properties as a result of gradual seepage of the lubricating component caused by centrifugal force or heat at the time of use of the rolling bearing. Consequently, the lubricating component may not be scattered at the time of rotation of the rolling bearing, whereby the lubricating component need not be supplied over a long time period.

When the lubricating composition is solidified by fully filling the region inside the rolling bearing, it functions as a barrier against water, dust, dirt, and the like from outside the rolling bearing, whereby it is considered that sealing members can be abandoned.

In this case, however, friction arises between the solidified lubricating composition and each of members constituting the rolling bearing (that is, an inner race, an outer race, rolling elements and a cage), and the friction is increased at the time of rotation of the rolling bearing as the whole, whereby it is expected that torque generated by the rolling bearing is increased.

On the other hand, when a clearance between the cage and the rolling elements, for example, is partially filled with the lubricating composition in order to decrease the torque generated by the rolling bearing, the function of the lubricating composition as the barrier against water, dust, dirt, and the like from outside the rolling bearing is lost, whereby sealing members with a complicated structure must be absolutely provided.

SUMMARY OF THE INVENTION

An object of the present invention is to provide a rolling bearing with a new structure which need not be necessarily provided with sealing members of a complicated structure and generates low torque, and an effective method of fabricating the same.

In order to attain the above-mentioned object, in one mode of the present invention, there is provided a rolling bearing being characterized by comprising a pair of races for defining an annular region therebetween, a plurality of rolling elements arranged in the annular region and rolling on each of the races, a cage arranged in the annular region and having pockets for holding the respective rolling elements, and a solid lubricating composition which is composed of a mixture of a resin and a lubricating component with which the annular region is filled. In the rolling bearing, a film including a lubricating component is formed in a clearance between the pocket and the rolling element in a state where the solid lubricating composition is prevented from being interposed therebetween.

In the rolling bearing according to this mode, the film including a lubricating component is formed in the clearance between the pocket of the cage and the rolling element, to prevent the solid lubricating composition from being interposed therebetween, whereby the frictional resistance of the rolling element can be reduced. Even if the annular region inside the rolling bearing is fully filled with the solid lubricating composition in order to perfectly function as a barrier against water, dust, dirt, and the like outside the rolling bearing, therefore, torque generated by the rolling bearing can be decreased. The necessity of sealing members with a complicated structure can be also eliminated.

If the film including a lubricating component is also formed on the respective surfaces in contact with the lubricating composition of the races, the rolling elements and the cage, the torque generated by the rolling bearing can be further decreased.

In another mode of the present invention, there is provided a method of fabricating the above-mentioned rolling bearing. The fabricating method is characterized by comprising the steps of forming the film including a lubricating component between the cage and the rolling elements, filling the above-mentioned region with the mixture of the resin and the lubricating component, and heating the mixture to not less than the melting point of the resin and then cooling the heated mixture, to obtain the above-mentioned solid lubricating composition.

According to the method of fabricating the rolling bearing in this mode, the rolling bearing according to the present invention which is superior in properties as described above can be fabricated only by supplying a lubricating component to the rolling bearing to form an oil film prior to the step of filling the region inside the rolling bearing with a fluid lubricating composition.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENT

An embodiment of the present invention will be described on the basis of attached drawings.

Figure 1:
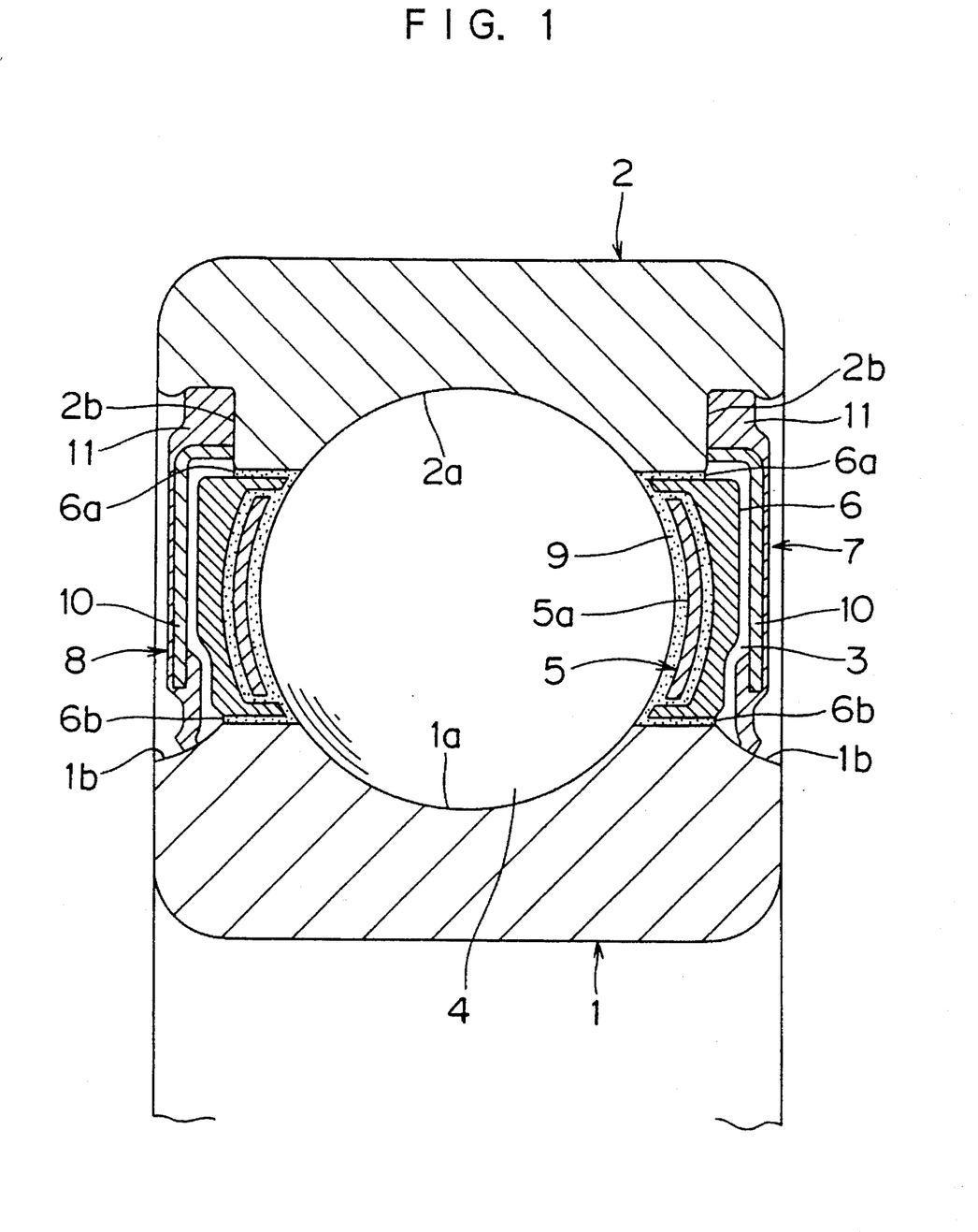
FIG. 1 is a cross-sectional view showing a rolling bearing according to one embodiment of the present invention.

Referring to FIG. 1, a rolling bearing comprises (1) an annular inner race 1 and an annular outer race 2 which serve as a pair of races for defining an annular region 3 therebetween, (2) balls 4 serving as a plurality of rolling elements which are arranged in the region 3 and roll on the inner race 1 and the outer race 2, (3) a cage 5 which is arranged in the region 3 and has pockets 5a for holding the respective balls 4, (4) a continuous solid lubricating composition 6 which is composed of a mixture of a resin and a lubricating component, with which the region 3 is filled, and (5) a pair of annular sealing members 7 and 8 which are arranged on both sides of the lubricating composition 6 interposed therebetween and are fixed to the outer race 2 and brought into sliding contact with the inner race 1.

Figure 2:
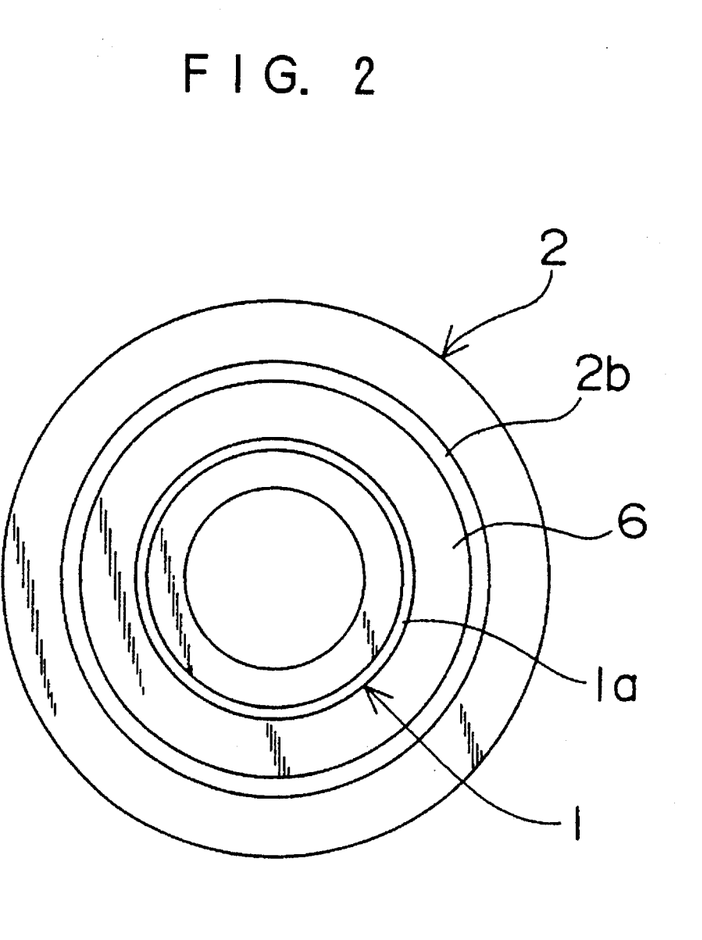
FIG. 2 is a front view showing the rolling bearing in a state where sealing members are removed.

The region 3 defined by the pair of sealing members 7 and 8 between the races 1 and 2 is filled substantially full with the solid lubricating composition 6. The reason why a clearance is formed between each of the sealing members 7 and 8 and the lubricating composition 6 is that the lubricating composition 6 shrinks in the case of solidification. As shown in FIG. 2, the solidified lubricating composition 6 as a whole is so formed continuous.

The present embodiment is characterized in that a film including a lubricating component 9 is formed on the respective surfaces in contact with the lubricating composition 6 of the inner race 1, the outer race 2, the balls 4 and the cage 5, and the film including a lubricating component 9 is formed between the pocket 5a and the ball 4 in a state where the solid lubricating composition is prevented from being interposed therebetween.

The film including a lubricating component 9 to be formed on the inner race 1 and the outer race 2 may be sufficient when it is formed on at least raceway surfaces 1a and 2a.

Each of the sealing members 7 and 8 has an annular metallic core 10 and an annular rubber member 11 burned on the metallic core 10. The sealing members 7 and 8 are fixed with their outer peripheral portions fitted in sealing portions 2b which are composed of grooves respectively formed on both end faces of the outer race 2, and the inner peripheral portions of the sealing members 7 and 8 are brought into elastic contact with concave sealing portions 1b formed on both end faces of the inner race 1.

Description is now made of the process of fabricating the rolling bearing according to the present embodiment.

Figure 3A:
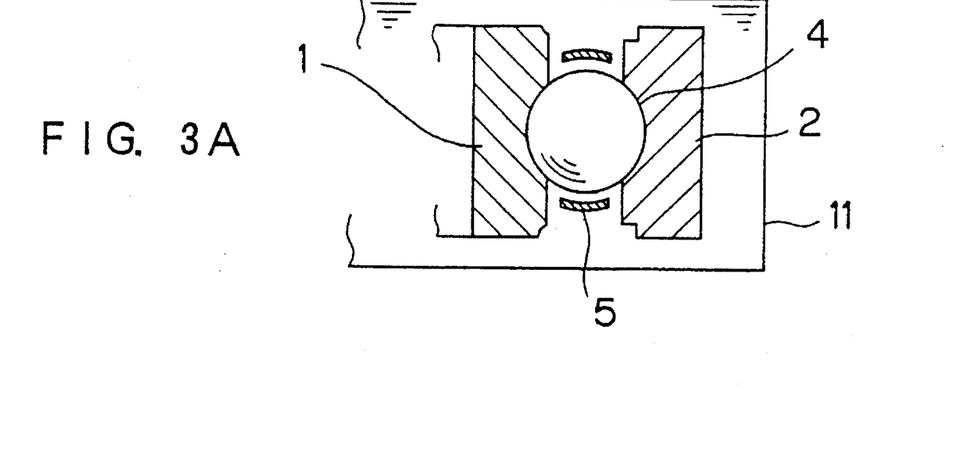
FIGS. 3A, 3B and 3C are schematic views showing the steps of a method of fabricating the rolling bearing.

The inner race 1, the outer race 2, the balls 4 and the cage 5 are first assembled into a unit. When the unit is then sunk in a bath 11 filled with a lubricating component for a predetermined time, and is then pulled up, a film including a lubricating component is formed on the respective surfaces of the inner race 1, the outer race 2, the balls 4 and the cage 5, and the film including a lubricating component is formed between the cage 5 and the balls 4.

The film including a lubricating component may be formed by applying a lubricating component to a required portion of the unit using a syringe and the like besides sinking the unit in the bath 11 as described above.

Figure 3B:
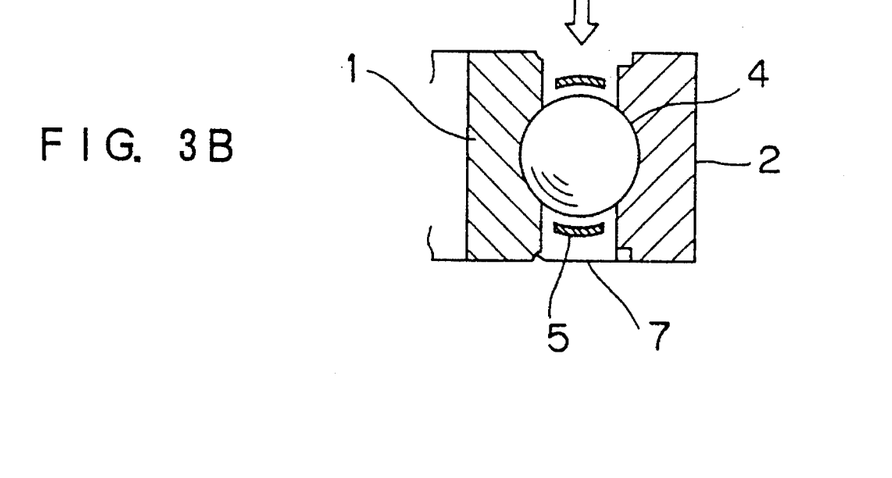
Figure 3C:
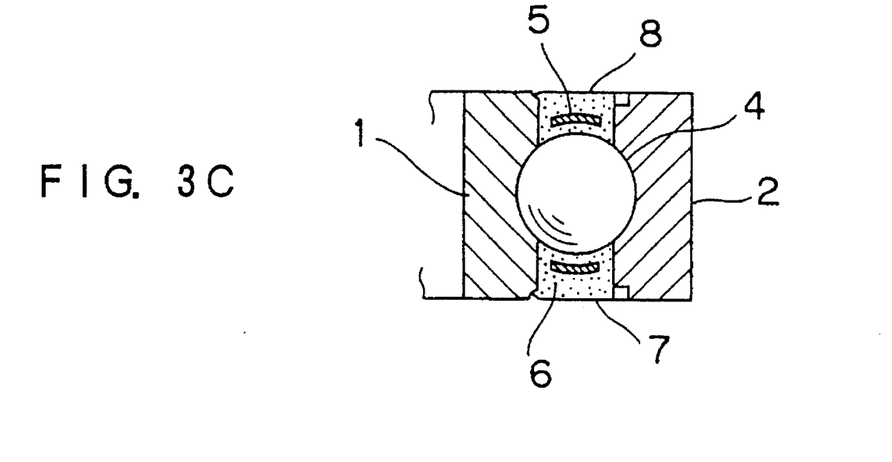

The unit is arranged in a state where the one sealing member 7 is mounted so that the region 3 is opened only upward and the region 3 is filled with a fluid lubricating composition from above, as shown in FIG. 3B, after which the other sealing member 8 is mounted to seal the region 3, as shown in FIG. 3C.

The mixture is then heated to not less than the melting point of the resin, and after that the heated mixture is cooled to solidify the fluid lubricating composition.

Figure 4:
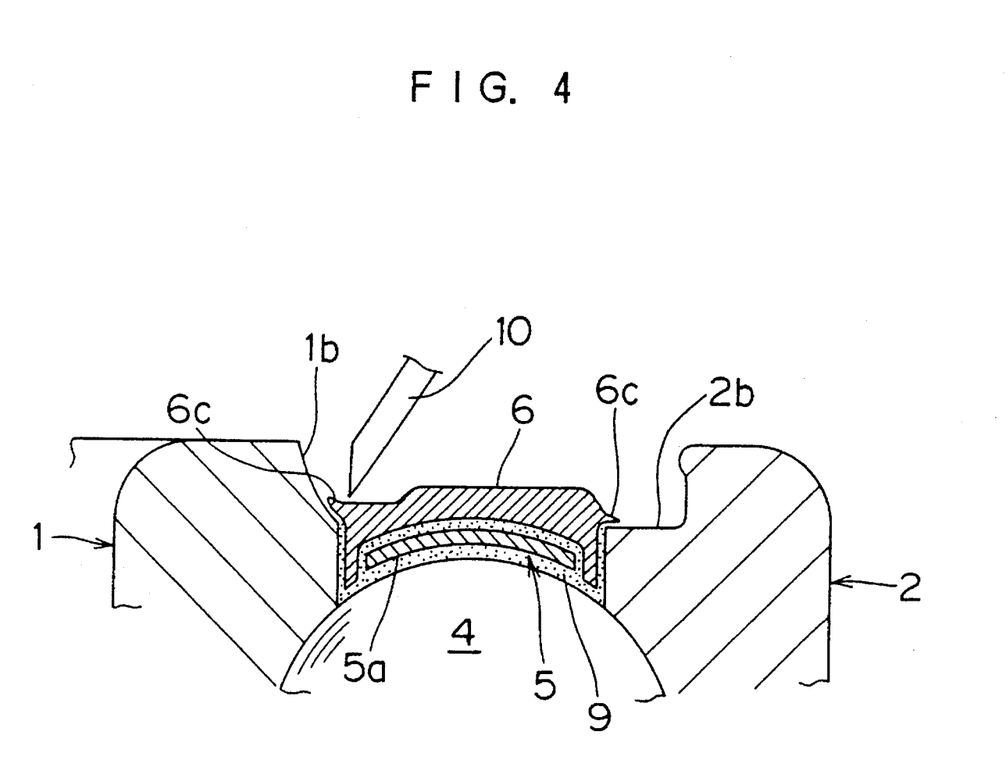
FIG. 4 is a schematic cross-sectional view of the rolling bearing showing how burrs of a solidified lubricating composition are removed.

Thereafter, the sealing members 7 and 8 are removed once, to cut and remove burrs 6c of the lubricating composition 6 using a cutter 10, as shown in FIG. 4. The fluid lubricating composition may, in some cases, be solidified with it entering portions between the sealing members 7 and 8, and the inner race 1 and the outer race 2 on which it is mounted. In this case, the portions which the lubricating composition enters may remain as the burrs 6c. If the burrs 6c interfere with each of the sealing members 7 and 8 and the sealing portions 1b and 2b of the inner race 1 and the outer race 2 which achieve a sealing function together with the sealing member, the sealing properties may be degraded. Therefore, it is preferable that the burrs 6c of the lubricating composition 6 are cut using a knife or the like.

The sealing members 7 and 8 are included to be used in the present embodiment. However, if the sealing members 7 and 8 are not included, however, a pair of annular sealing jigs which can seal the region 3 with it being interposed between the inner race 1 and the outer race 2 (which may be in the same shape as that of the sealing members or may be in the other shape) can be used to fill the region 3 with the fluid lubricating composition, and solidify the lubricating composition by heating and cooling.

In the present embodiment, as the lubricating composition 6 with which the region 3 inside the rolling bearing is filled, various lubricating compositions conventionally known each of which is composed of a mixture of a resin and a lubricating component can be used, if they can be supplied in a fluid shape to fill the region, and be solidified by cooing after heating them to not less than the melting point of the resin.

Although the resin is not limited to the following, ultra-high-molecular-weight polyethylene, polypropylene, and polymethylpentene are preferably used. Ultra-high-molecular-weight polyethylene is suitably used because it is superior in mechanical properties or the like. As such ultra-high-molecular- weight-polyethylene, one having an average molecular weight of about 1,000,000 to 6,000,000 and particularly, 2,000,000 or more and having a melting point of about 100° to 140° C. is suitably used.

Various additives conventionally known such as an antioxidant, a stabilizer, or a colorant can be also mixed with the resin in approximately the same ratio as that in the conventional example, as required.

It is preferable that the resin is supplied as a powder and granular material. The particle diameter of the powder and granular material of the resin is not particularly limited. In general, the average particle diameter is preferably in the range of about 5 to 100 μm, and is more preferably in the range of about 10 to 30 μm.

As a lubricating component which constitute the lubricating composition 6 together with the resin, various lubricating oils conventionally known can be used. Particularly, a stable lubricating component which may not degrade the mechanical properties of the resin upon reacting with the resin by heating in a solidifying process of the lubricating composition is suitably used.

Although the lubricating oil used as the lubricating component is not limited to the following, mineral oil, poly-α-olefin oil, diester oil, polyol ester oil, alkyl diphenyl ether oil, silicone oil, paraffin oil, and fluorine oil are examples.

Various additives can be also mixed with the lubricating oil in order to improve properties such as lubricating properties and stability.

As the lubricating component, each of the lubricating oils can be independently used, or two or more lubricating oils can be used in combination.

Although the compounding ratio of the resin and the lubricating component which constitute the lubricating composition 6 are not particularly limited in the present invention, it is preferable that both are so mixed that the weight percentage of the resin in the lubricating composition is 10 to 50% by weight.

When the weight percentage of the resin is less than 10% by weight, the lubricating composition may not be solidified even if it is cooled after heating it to not less than the melting point of the resin. When the weight percentage of the resin exceeds 50% by weight, the flowability before solidification may be degraded, making it difficult to fully fill a space inside the bearing.

It is preferable that the weight percentage of the resin is particularly about 20 to 40% by weight in the above-mentioned range in consideration of the lubricating properties of the lubricating composition 6.

The conditions of heating out of processing for solidifying the lubricating composition 6 with which the region 3 inside the rolling bearing is filled may be the same as those in the conventional example. That is, the lubricating composition 6 may be heated for a time period during which resins are sufficiently welded to each other at temperatures of not less than the melting point of the resin. For example, a lubricating composition containing 20 to 40% by weight of ultra-high-molecular-weight polyethylene having a melting point of 136° C. can be solidified by heating a rolling bearing including a space filled with the lubricating composition at temperatures of about 160° to 170° C. for about five minutes to several tens of minutes, preferably, for about five minutes to fifteen minutes.

Examples of the lubricating component supplied to the rolling bearing prior to the filling with the lubricating composition for forming the above-mentioned film include a lubricating oil which is the same as or different from that used in the lubricating composition or grease.

Although the properties of such a lubricating component are not particularly limited, the kinematic viscosity of the lubricating component is an important factor which affects the thickness or the like of a film formed on each of the above-mentioned members constituting the rolling bearing and consequently, affects the function of reducing friction between each of the members constituting the rolling bearing and the lubricating composition solidified after filling the space inside the rolling bearing. In the present invention, it is preferable that the kinematic viscosity is in the range of 50 to 200 $mm^2/S$.

When the kinematic viscosity of the lubricating component is less than the above-mentioned range, a film including a lubricating component having a considerable thickness cannot be formed in each of the members constituting the rolling bearing. When the kinematic viscosity of the lubricating component exceeds the above-mentioned range, the viscosity of the lubricating component itself is too high. In either case, therefore, the function of reducing the friction between each of the members constituting the rolling bearing and the solidified lubricating composition is insufficient, whereby torque generated by the rolling bearing may be increased.

It is preferable that the kinematic viscosity of the lubricating component is particularly in the range of 100 to 200 $mm^2/S$ in the above-mentioned range.

In mixing a lubricating oil with grease, for example, the compounding ratio of the lubricating oil and the grease may be adjusted in order to adjust the kinematic viscosity of the lubricating component in the above-mentioned range.

As a method of supplying the lubricating component to the rolling bearing in order to form the film including a lubricating component in each of the members constituting the rolling bearing, various methods are considered. The simplest method is a method of dipping the rolling bearing in the lubricating component, as described above. The lubricating component may be injected into the region inside the rolling bearing using a syringe or the like.

In the rolling bearing according to the present embodiment, friction between each of the members 1, 2 and 5 constituting the rolling bearing and the solid lubricating composition 6 is small. Particularly, the film including a lubricating component is formed in a clearance between the pocket 5a of the cage 5 and the ball 4, whereby the solid lubricating composition is prevented from being interposed therebetween. Consequently, the frictional resistance of the ball 4 can be reduced. Even if the region inside the rolling bearing is fully filled with the solid lubricating composition 6 in order to perfectly function as a barrier against water, dust, dirt, and the like from outside the rolling bearing, therefore, the torque generated by the rolling bearing can be decreased. The necessity of the sealing members can be also eliminated. That is, the sealing members are not indispensable members. In the present embodiment, the sealing members are employed in order to further enhance the sealing properties. If the sealing members are abandoned, the sealing portions of the inner race 1 and the outer race 2 are also abandoned.

The fabricating method according to the present embodiment has the advantage that the rolling bearing according to the present embodiment which is superior in properties as described above can be fabricated by only supplying the lubricating component to the rolling bearing to form the film including a lubricating component prior to the process of filling the region 3 inside the rolling bearing with the fluid lubricating composition 6.

The rolling bearing having the solid lubricating composition as in the present embodiment is suitable for the application to a rolling bearing for rotating and supporting a guide roller of a stranding machine. The reason for this is that the rolling bearing itself is revolved in the stranding machine, whereby a lubricant having flowability is scattered by a centrifugal force. In the stranding machine, pickling water for pickling processing which is suitably performed may enter the rolling bearing. Also in this case, the lubricant having flowability flows out. From the point of view of preventing pickling water or the like from flowing into the rolling bearing, a rolling bearing on which sealing members are mounted is preferable as the rolling bearing for the guide roller of the stranding machine. The sealing members in this case may also have a simpler structure, as compared with the sealing members in a case where the lubricant having flowability is sealed. It goes without saying that a complicated sealing structure may be employed.

The present invention can be applied to a rolling bearing such as a needle roller bearing or a self-aligning roller bearing.

EXAMPLE 1

A radial ball bearing (JIS bearing number 6306ZZ) made of bearing steels having a wave cage was dipped in poly-α-olefin (having kinematic viscosity of 148 mm$^2$ / S) which is a lubricating component, and was then pulled up, to form an oil film on the surface of each of members constituting the ball bearing.

An annular region defined between an inner race and an outer race of the ball bearing was fully filled with a fluid lubricating composition containing 30 parts by weight of ultra-high-molecular-weight polyethylene powder and 70 parts by weight of poly-α-olefin (having kinematic viscosity of 148 mm$^2$ / S). The lubricating composition was then solidified upon heating for fifteen minutes at a temperature of 170° C. and then cooling, thereby fabricating a rolling bearing in an example 1.

Comparative Example

A rolling bearing in a comparative example 1 is fabricated in the same manner as that in the example 1 except that work for dipping a rolling bearing in a lubricating component to form an oil film on the surface of each of members constituting the rolling bearing is omitted.

Torque generated by each of the rolling bearings in the example 1 and the comparative example 1 is measured by the following method. As a result, the initial torque in the rolling bearing in the example 1 is 5.72 ×10$^{-2}$ N ·m, and the initial torque in the rolling bearing in the comparative example 1 is 10.84 ×10$^{-2}$ N ·m.

Figure 5:
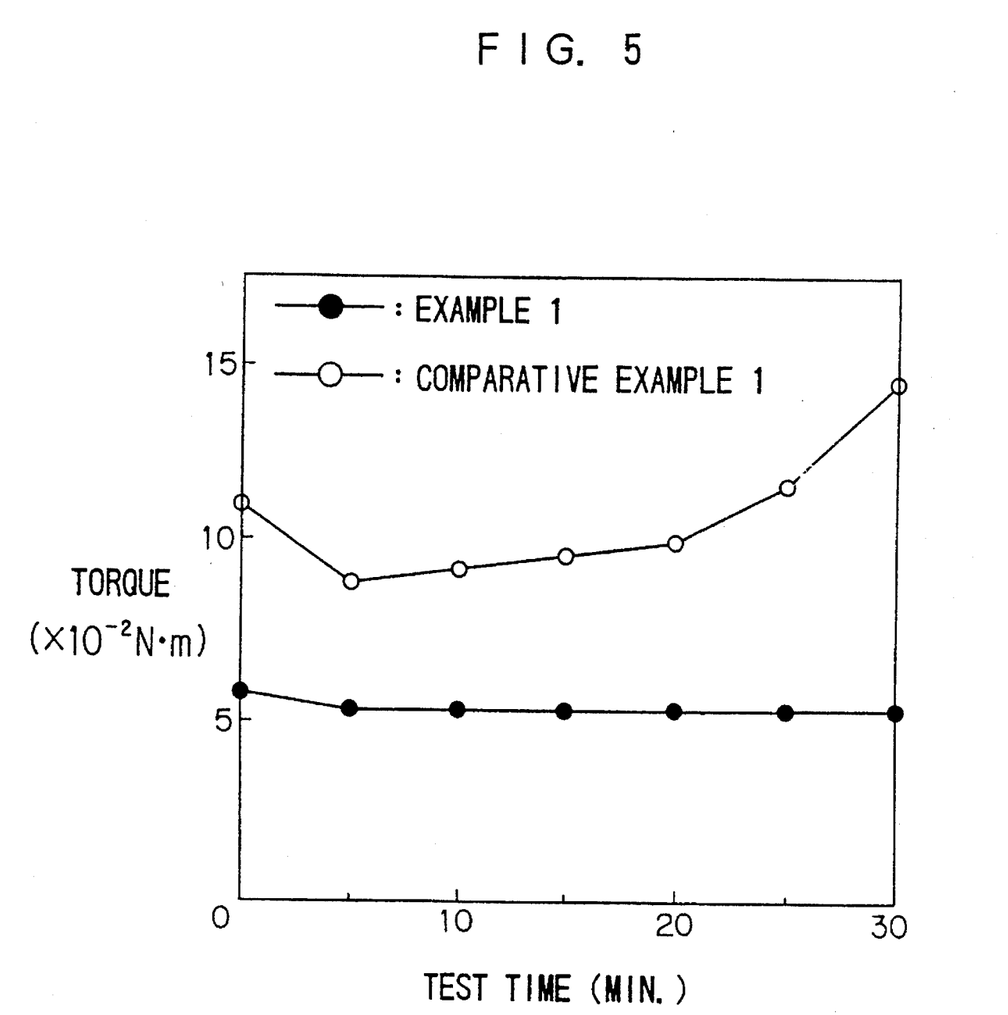
FIG. 5 is a graph showing the results of measurement of torque in each of rolling bearings in an example of the present invention and in a comparative example.

This proves that the torque can be decreased by approximately one-half by forming the oil film. As shown in FIG. 5, the torque in the rolling bearing in the example 1 is almost constant even if the rolling bearing is continuously rotated for 30 minutes, while the torque in the rolling bearing in the comparative example 1 is decreased once and is then gradually increased to reach a value approximately three times the torque in the rolling bearing in the example 1 after 30 minutes.

Method of Measuring Torque

A force exerted on an outer race by the rotation of an inner race in a case where the inner race is rotated at a speed of 3500 r.p.m. under a condition of room temperature (20° C) is measured using a load cell.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A rolling bearing comprising:
   a pair of races for defining an annular region therebetween;
   a plurality of rolling elements arranged in the region and rolling on each of the races;
   a cage arranged in the region and having pockets for holding the respective rolling elements; and
   a solid lubricating composition which is composed of a mixture of a resin and a lubricating component, with which the region is filled;
   a film including a lubricating component being formed between the pocket and the rolling element in a state where the solid lubricating composition is prevented from being interposed therebetween.

2. The rolling bearing according to claim 1, wherein
   the film including a lubricating component is formed on the respective surfaces in contact with the lubricating composition of the races, the rolling elements and the cage.

3. The rolling bearing according to claim 1, wherein
   the lubricating component included in the mixture and the lubricating component included in the film include the same type of lubricating oil.

4. The rolling bearing according to claim 1, wherein
   the resin is selected from a group of polyethylene, polypropylene, and polymethylpentene.

5. The rolling bearing according to claim 1, wherein
   the resin is composed of polyethylene having an average molecular weight of 1,000,000 to 6,000,000.

6. The rolling bearing according to claim 1, wherein
   the resin is composed of polyethylene having an average molecular weight of 2,000,000 to 6,000,000 and a melting point of 100° to 140 ° C.

7. The rolling bearing according to claim 1, wherein the resin includes a large number of powder and granular materials.

8. The rolling bearing according to claim 1, wherein
   the resin includes a large number of powder and granular materials having an average particle diameter of 5 to 100 μm.

9. The rolling bearing according to claim 1, wherein
   the resin includes a large number of powder and granular materials having an average particle diameter of 10 to 30 μm.

10. The rolling bearing according to claim 1, wherein
    the lubricating component included in the lubricating composition includes a lubricating oil,
    the lubricating oil including at least one selected from a group of mineral oil, poly-α-olefin oil, diester oil, polyol ester oil, alkyl diphenyl ether oil, silicone oil, paraffin oil, and fluorine oil.

11. The rolling bearing according to claim 1, wherein
    the weight percentage of the resin in the lubricating composition is 10 to 50 percent by weight.

12. The rolling bearing according to claim 1, wherein
    the lubricating component included in the lubricating composition has kinematic viscosity of 50 to 200 mm$^2$ / S.

13. The rolling bearing according to claim 1, wherein
    the lubricating component included in the lubricating composition has kinematic viscosity of 100 to 200 mm$^2$ / S.

14. The rolling bearing according to claim 1, further comprising a pair of sealing members respectively arranged on both sides of the lubricating composition and fixed to either one of the races, and sealing the region.

15. The rolling bearing according to claim 14, wherein each of the races comprise sealing portions respectively related to the sealing members, and the solid lubricating composition is cut in order to avoid interference with the sealing portions.

16. The rolling bearing according to claim 1, wherein solid lubricating composition as a whole is continuous.

* * * * *